US011431838B1

(12) United States Patent
Avula et al.

(10) Patent No.: US 11,431,838 B1
(45) Date of Patent: Aug. 30, 2022

(54) INTERACTION WITH MOBILE APPLICATION-BASED ITEM LISTS VIA LOCK SCREEN NOTIFICATIONS

(71) Applicant: Amazon Technologies, Inc., Seattle, WA (US)

(72) Inventors: Sandeep Avula, Seattle, WA (US); Vanessa Graham Murdock, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/308,434

(22) Filed: May 5, 2021

(51) Int. Cl.
*H04M 1/72484* (2021.01)
*H04M 1/72454* (2021.01)
*H04M 1/72457* (2021.01)
*G06F 3/0482* (2013.01)
*G06F 3/04883* (2022.01)

(52) U.S. Cl.
CPC ...... *H04M 1/72484* (2021.01); *G06F 3/0482* (2013.01); *G06F 3/04883* (2013.01); *H04M 1/72454* (2021.01); *H04M 1/72457* (2021.01); *H04M 2201/42* (2013.01)

(58) Field of Classification Search
None
See application file for complete search history.

(56) References Cited

U.S. PATENT DOCUMENTS

| | | | | |
|---|---|---|---|---|
| 10,262,509 | B1* | 4/2019 | Eidam | H04N 5/76 |
| 2013/0115927 | A1* | 5/2013 | Gruber | G06Q 10/109 |
| | | | | 455/414.1 |
| 2013/0332826 | A1* | 12/2013 | Karunamuni | G06Q 10/10 |
| | | | | 715/273 |
| 2014/0173602 | A1* | 6/2014 | Kikin-Gil | G06Q 10/1097 |
| | | | | 718/100 |
| 2014/0280578 | A1* | 9/2014 | Barat | H04L 67/22 |
| | | | | 709/204 |
| 2015/0350147 | A1* | 12/2015 | Shepherd | G06F 3/04842 |
| | | | | 715/752 |
| 2015/0358550 | A1* | 12/2015 | Faber | H04M 1/72439 |
| | | | | 348/333.02 |
| 2016/0086241 | A1* | 3/2016 | Proulx | H04L 67/26 |
| | | | | 705/26.4 |
| 2017/0164171 | A1* | 6/2017 | Peterson | H04W 24/02 |
| 2017/0200353 | A1* | 7/2017 | Brown | G08B 6/00 |
| 2017/0336913 | A1* | 11/2017 | Yoo | G06F 1/1647 |
| 2017/0359169 | A1* | 12/2017 | Benson | H04L 9/14 |
| 2019/0073655 | A1* | 3/2019 | Barkan | G06K 7/1413 |

* cited by examiner

*Primary Examiner* — Daniel Rodriguez
*Assistant Examiner* — Gabriel Mercado
(74) *Attorney, Agent, or Firm* — Eversheds Sutherland (US) LLP

(57) ABSTRACT

Systems, devices, and methods are provided for interacting with item lists via lock screen notifications. In at least one embodiment, a user performs a computer-based action on a notification that is accessible to a user while a device is in a locked state and the computer-based action is used to perform an operation supported by an item list, without requiring the user to perform an authentication and/or authorization to unlock the device.

20 Claims, 7 Drawing Sheets

INTERACTION WITH MOBILE APPLICATION-BASED ITEM LISTS VIA LOCK SCREEN NOTIFICATIONS

BACKGROUND

Mobile devices can be used in many circumstances—a user of a mobile device may use the mobile device while physically navigating through various real world locations, such as parks, offices, and stores. However, a user's attention may be divided such that the user may briefly consult the mobile device for information and then act on the information. Many mobile devices have a lock screen time out that will turn the device's screen off and/or lock the device if the user does not interact with the device over a preset period of time, which may be on the order of seconds or minutes. Once a mobile device is locked, authentication and/or authorization such as a passcode may be required to resume use various functionality of the mobile device. While having these lock screen timers can be helpful to the security of a mobile device and preventing unauthorized access if the mobile device is stolen, it presents challenges to users in various contexts where the user's attention may be divided. For example, it may be cumbersome for a user to repeatedly perform an authorization and/or authentication process each time a user consults the mobile device while navigating through a real world location.

Figure 1:
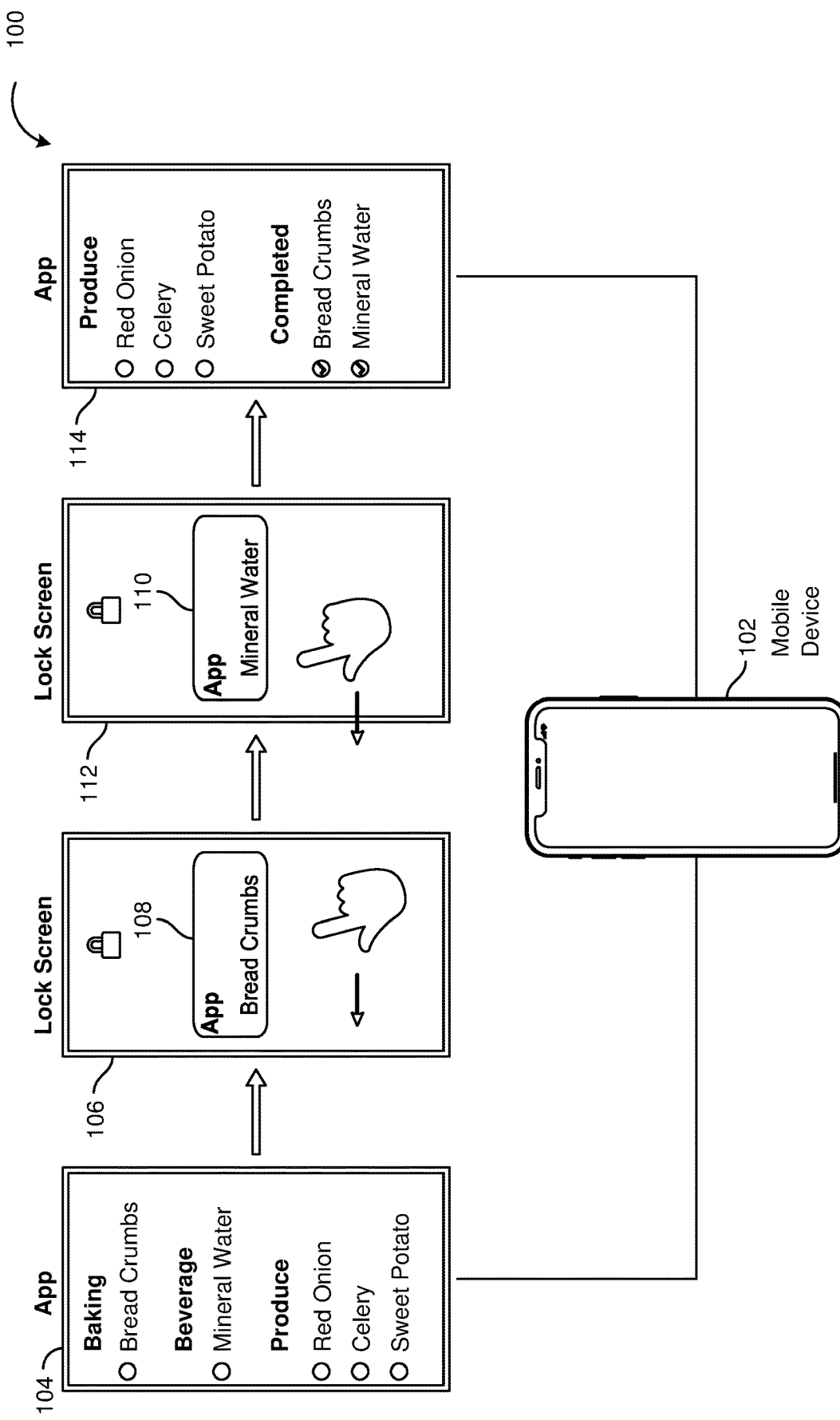
FIG. 1 illustrates interactions with list item notifications over a lock screen, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for interacting with mobile application-based item lists via lock screen notifications.

A mobile application running on a mobile device may be capable of displaying various types of content, such as item lists. For example, a mobile application may have access to a shopping list with various items, which may have been selected by a user, suggested by a computer-based algorithm, a combination thereof, or other suitable means. As an illustrative example, a mobile application may provide a user access to a shopping list with various list items such as "Bread crumbs"; "Mineral water"; "Red Onion"; "Celery"; and "Sweet Potato." This shopping list may be accessible to a user interacting with a mobile application on a mobile device.

However, various types of mobile devices have security settings that are designed to automatically lock the mobile device. For example, a mobile phone may have security settings that cause a mobile operating system to lock the mobile phone after a predetermined period of inactivity, when the screen shuts off (e.g., based on a time out or user pressing a button to turn the screen off). A device may enter a locked state when it is automatically or manually locked. When a mobile device is in a locked state, a user's ability to interact with the mobile device may be limited. Hardware and/or software such as a mobile device's operating system may limit a user to access only certain data of the mobile device and may only allow certain computer-based actions to be performed. For example, when a mobile device is in a locked state, information that was previously accessible to a user (e.g., shopping list in mobile application) may become inaccessible to the user without an authentication and/or authorization step, such as providing biometric data or a passcode that matches expected biometric data or passcode that was previously registered with the mobile device.

As described in greater detail below, and in accordance with at least one embodiment, when a mobile device enters a locked state, a mobile application may generate a list item notification so that a user may continue to interact with the mobile application. For example, when a mobile application enters a locked state, the mobile application may make a determination to generate list item notifications. For example, when a user is in a store, list item notifications for a shopping list relevant to that store may be generated.

List item notifications may be presented to a user of a mobile device on a lock screen, where the user has limited access to information and can only perform a limited set of computer-based actions. The set of computer-based actions that can be performed in the locked state may be dictated by the mobile device's operating system. For example, the user may be able to swipe left to dismiss notifications, swipe right to snooze notifications, but may not be able to perform other computer-based actions without providing authorization and/or authentication such as tapping on the notification to drill into the mobile application for more details on the list item and/or the shopping list as a whole. To address a user's limited ability to interact with and access computer-based item lists, a mobile application may generate a list item notification as described in greater detail below.

A list item notification may correspond to a particular list item from the shopping list. For example, the first item in the shopping list may be "Bread crumbs" and the mobile application may generate a notification for that list item. A list item notification may be generated by mobile application and submitted to a mobile operating system which presents the notification on a mobile device's lock screen.

As noted above and below in greater detail, when a mobile device is in a locked state, a user may only be able to perform a limited set of computer-based actions. A user may be able to perform one of a set of computer-based actions that are supported in a locked state. For example, a user may swipe left on the list item notification to dismiss the notification, removing it from the lock screen. In at least one embodiment, when a user performs a computer-based action, it is mapped to a corresponding list item operation. For example, dismissing a list item notification from the lock screen may be mapped to checking the item off as being completed on the shopping list. In some embodiments, a user is able to swipe left on a notification to dismiss it and swipe right to snooze it—these may map to respective list item operations to dismiss the corresponding list item and skip the corresponding list item. A user can interact with a shopping list while the device is in a locked state by swiping left to dismiss a notification, which will also check the item as being completed and will be reflected in the shopping list in a mobile application. Thus, the need for the user to otherwise perform an authentication or authorization step— which may be difficult for a user to perform while physically shopping for items—is obviated through a single computer-based action on the lock screen which does not require an additional authentication and/or authorization step from the user.

Upon interacting with a list item notification, the lock screen may be updated. For example, a user may swipe left to indicate that the user has obtained the "Bread crumbs" item in the shopping list. Dismissal of the notification may also trigger the creation of a second list item notification for the next item on the shopping list, which may be subsequently displayed on the lock screen. For example, a second list item notification for "Mineral water" replaces the first list item notification for "Bread crumbs" after it has been dismissed so that there is always at least one list item notification shown on the lock screen, until the shopping list has been fully traversed. In this way, the user is always provided access to some information of the shopping list that aids the user's shopping experience.

As described in greater detail below, various problems and/or solutions described herein are rooted in computer-technology and/or arise out of the realm of computer-based systems. In the context of computer systems such as mobile devices, security measures may be taken to prevent unauthorized access. For example, various computer systems require a user to perform an authentication and/or authorization process to gain access to the computer system. Access to the computer system may entail the ability to interact with certain data (e.g., view or modify), the ability to launch applications, interact with other computer systems, and more. Accordingly, in various contexts, the security of such computer systems is important. Various types of computer systems implement security measures that are performed automatically. One such example of an automatic security measure is a lock screen time out, which can be implemented by automatically locking a computer system after a certain period of inactivity, which may be on the order of seconds or minutes. In some cases, a mobile device may enter a locked state immediately upon the mobile device's screen turning off or entering an idle state. Accordingly, a device may be automatically locked for a variety of reasons, such as the device being unused for a brief period of time.

When a device is in a locked state, the ability to perform various computer-based actions (e.g., execute applications) and access data may be limited. For example, a locked device may allow a user to perform a first computer-based action (e.g., enter a sequence of digits and characters as a passcode) but not perform a second computer-based action (e.g., launch security settings applications that can be used to disable the lock screen). In some cases, security settings are enforced for the safety of a user, organization, network, etc. In some cases, security settings cannot be disabled or weakened, and a lock screen is required by an Information Technology (IT) policy.

Users may interact with mobile devices differently from mainframes and servers. For example, a user of a mobile device may rely on data stored in the mobile device while navigating through a location such as an office, park, or store. In various scenarios, a user may wish to consult the mobile device for first information pertinent to the location, act on the first information in the real world, and then consult second information pertinent to the location, act on the second information, and so on. However, the mobile device's lock screen time out may cause the device to become locked while the user is acting on the first information, so when the user attempts to access the second information, the user must perform an authentication and/or authorization process, which may be repeated multiple times when user has a a list of first, second, third, etc. informations to access. A small number of notifications may be viewable via lock screen notifications, but may be insufficiently to display an entire list of first, second, third, etc. informations that is sufficiently large. Attempting to display too many notifications may result in the notifications being collapsed such that the contents of individual informations are not accessible on the lock screen. A limited number of computer-based actions may be supported for interacting with notifications, such as gestures to dismiss or snooze a notification, but the default computer-based actions supported by a mobile device's operating system may not directly correspond to operations supported by item lists, such as checking off an item or skipping an item. Accordingly, techniques described herein solve a problem rooted in computer technology wherein limited amounts of information and computer-based actions are supported but a mobile application may have an item list exceeds that limited amount of information and has various operations on list items that are not natively supported by the computer-based actions that the device's operating system.

For example, if a user is shopping for groceries, the user may only refer the grocery list periodically. Many mobile devices have a lock screen time out that will turn the device's screen off and/or lock the device if the user does not interact with the device over a preset period of time, which may be on the order of seconds or minutes. While having these lock screen timers can be helpful to the security of the device and preventing unauthorized access if the device is stolen, it presents a challenge to users in various shopping contexts. For example, in a grocery store setting, a user may consult the shopping list on the mobile device, identify an item on the shopping list, and then cease to interact with the mobile device while the user goes to look for the item, bags the item, and so on. The amount of time it takes for a typical user to find an item may exceed the device's lock screen time out, so when the user returns to the mobile device to find the next item on the shopping list, the user encounters a locked screen, which may require the user to perform an authentication process, such as providing a passcode or performing various other authentication processes such as fingerprint scan, iris scan, facial recognition, voice recognition, etc. to verify that authorization to the device should be granted. Techniques described herein obviate the need for a user to repeatedly perform an authentication and/or authorization process to interact with mobile application information (e.g., view and/or perform operations on such information).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates interactions with list item notifications, in accordance with one or more example embodiments of the present disclosure. In at least one embodiment, diagram 100 illustrates how a user uses notifications or other information accessible via lock screen to interact with an underlying data of a mobile application, such as an item list. FIG. 1 depicts various user interfaces of mobile device 102 as a user performs various computer-based actions. Techniques described in connection with FIGS. 2-7 may be utilized in connection with FIG. 1

On the left side of diagram 100, a first graphical user interface (GUI) 104 is shown, according to at least one embodiment. In various embodiments, first GUI 104 shown in FIG. 1 is illustrated as a mobile application which displays, via display of a computing device, various information that is accessible to the mobile application. For example, the mobile application may have access to a shopping list with various items, which may have been selected by a user, suggested by a computer-based algorithm, a combination thereof, or other suitable means. In some embodiments, mobile application on a device obtains the item list from a service provider via a network. The shopping list may be accessible to multiple devices, and changes to the item list may be synchronized across multiple devices in any suitable manner. As an illustrative example, FIG. 1 depicts a mobile application with a shopping list with various list items such as "Bread crumbs"; "Mineral water"; "Red Onion"; "Celery"; and "Sweet Potato." List items may be described in terms of quantity, item type, stock-keeping unit (SKU), Price Look-Up (PLU), and more.

The shopping list shown in FIG. 1 may be accessible to a user via a mobile application which can be launched via mobile device 102 in any suitable manner, such as by tapping an icon associated with the mobile application. In various embodiments, mobile device 102 has various security settings, which may be implemented as hardware, software, or a combination thereof. For example, mobile device 102 may have security settings that automatically lock the device after a certain period of inactivity, when the device's screen turns off, and so on.

When mobile device 102 is in a locked state, a user's ability to interact with the mobile device may be limited. When a mobile device is in a locked state, hardware and/or software such as the mobile device's operating system may limit a user to access only certain data of the mobile device and may only allow certain computer-based actions to be performed. For example, second GUI 106 illustrates mobile device 102 in a locked state, which in accordance with at least one embodiment, occurs subsequent to a user interacting with first GUI 104. When mobile device 106 enters a locked state, first GUI 104 may be inaccessible to the user without an authentication and/or authorization step, such as providing biometric data or a passcode that matches expected biometric data or passcode that was previously registered with the mobile device.

In at least one embodiment, when mobile device 102 enters a locked state, mobile application may generate a list item notification so that a user may continue to interact with the shopping list in first GUI 104. For example, when a mobile application enters a locked state, a dormant state, or any other state in which access to an item list is limited, the mobile application may determine whether to generate list item notification(s). This determination may be made on one or more criteria, such as whether the user is at a specific location (e.g., relying on GPS receiver information to determine GPS coordinates of the mobile device, determine first metadata associated with the GPS coordinates—such as using an online maps service to determine that the user is in a specific store or type of store, and then determine whether the first metadata matches second metadata associated with the shopping list. Second metadata associated with the shopping list may be the types shopping list, the type of items in the shopping list, etc. so that comparing the first metadata and the second metadata can be used to determine whether a user is able to purchase one or more items from the shopping list at the user's location. In some embodiments, the user needs to opt in to list notifications, which may involve the user enabling or confirming a setting in the mobile application to grant access to generate list item notifications.

Upon determining that list notifications should be generated, the mobile application may generate a list item notification and present it via second GUI 106. Second GUI 106 may be on a lock screen, where a user has limited access to information and can only perform a limited set of computer-based actions. The set of computer-based actions that can be performed in the locked state may be dictated by the mobile device's operating system. For example, the user may be able to swipe left to dismiss notifications, swipe right to snooze notifications, but may not be able to perform other computer-based actions without providing authorization and/or authentication such as tapping on the notification to drill into the mobile application for more details on the list item and/or the shopping list as a whole. To address a user's limited ability to interact with and access computer-based item lists, a mobile application may generate a list item notification as shown in second GUI 106.

List item notification 108 may correspond to a particular list item from the shopping list shown in first GUI 104. For example, the first item in the shopping list may be "Bread crumbs" and the mobile application may generate a notification for that list item. In various embodiments, list item notification 108 includes information about the list item, such as a quantity, the item description, a particular product (e.g., brand name or SKU). In some embodiments, mobile application obtains additional information about the list item from other sources, such as querying store and/or inventory information to determine a location for the item (e.g., which Aisle the item may be found in) and whether the item is in stock or out of stock. In some embodiments, a mobile application queries an inventory system to determine that a particular item (e.g., based on SKU) is out of stock and recommends a similar item (e.g., same item type but different SKU) that is in stock. In some embodiments, a user has the option to enable suggestions—for example, if a user includes a first item in the shopping list but allows for substitutions based on various criteria such as price, a different item (e.g., same type of item but cheaper) may be suggested in the notification. Additional text may accompany the recommendation such as "Recommended—Acme Corp. Ketchup is $0.39 cheaper!" A list item notification may be generated by mobile application and submitted to a mobile operating system which presents the notification on second GUI 106. In some embodiments, mobile application specifies a callback which is invoked when a user performs a computer-based action on the notification. For example, a first callback may correspond to a first computer-based action (e.g., Dismiss) being performed and a second callback may correspond to a second computer-based action (e.g., Snooze) being performed.

As noted elsewhere, when device 102 is in a locked state, a user may only be able to perform a limited set of computer-based actions. A user may perform one of a set of computer-based actions that are supported in a locked state. For example, a user may swipe left on the list item notification 108 to dismiss the notification, removing it from the lock screen. In at least one embodiment, when a user performs a computer-based action, it is mapped to a corresponding list item operation. For example, dismissing a list item notification from the lock screen may be mapped to checking the item off as being completed on the shopping list. This may be performed using a callback mechanism with a background agent, or any other suitable response mechanism. In some embodiments, a user is able to swipe left on a notification to dismiss it and swipe right to snooze it—these may map to respective list item operations to dismiss the corresponding list item and skip the corresponding list item. As an illustrative example, FIG. 1 illustrates how a user can interact with a shopping list while the device is in a locked state by swiping left to dismiss the notification, which will also check the item as being completed and will be reflected in the shopping list in the mobile application. Thus, the need for the user to otherwise perform an authentication or authorization step—which may be difficult for a user to perform while physically shopping for items—is obviated through a single computer-based action on the lock screen which does not require an additional authentication and/or authorization step from the user.

Upon interacting with list item notification 108, the lock screen may be updated. For example, in second GUI 106, the user may swipe left to indicate that the user has obtained the "Bread crumbs" item in the shopping list. Dismissal of the notification may also trigger the creation of a second list item notification 110 for the next item on the shopping list, which may be subsequently displayed on the lock screen. As seen in third GUI 112, the second list item notification 110 for "Mineral water" replaces the first list item notification 108 so that there is always at least one list item notification shown on the lock screen, in accordance with at least one embodiment. In this way, the user is always provided access to some information of the shopping list that aids the user's shopping experience.

Fourth GUI 114 shows the state of the mobile application after a user interacts with various list item notifications on the lock screen. For example, the user may use a computer-based action to dismiss list item notifications for "Bread crumbs" and "Mineral water" thereby indicating that those items should be marked completed. If the user then subsequently unlocks the mobile device 102 (e.g., by providing a passcode) the user may navigate to the mobile application with the shopping list and see that the operations supported by the shopping list (e.g., checking them off) have been performed based on the computer-based actions that were performed on the list item notifications.

Figure 2:
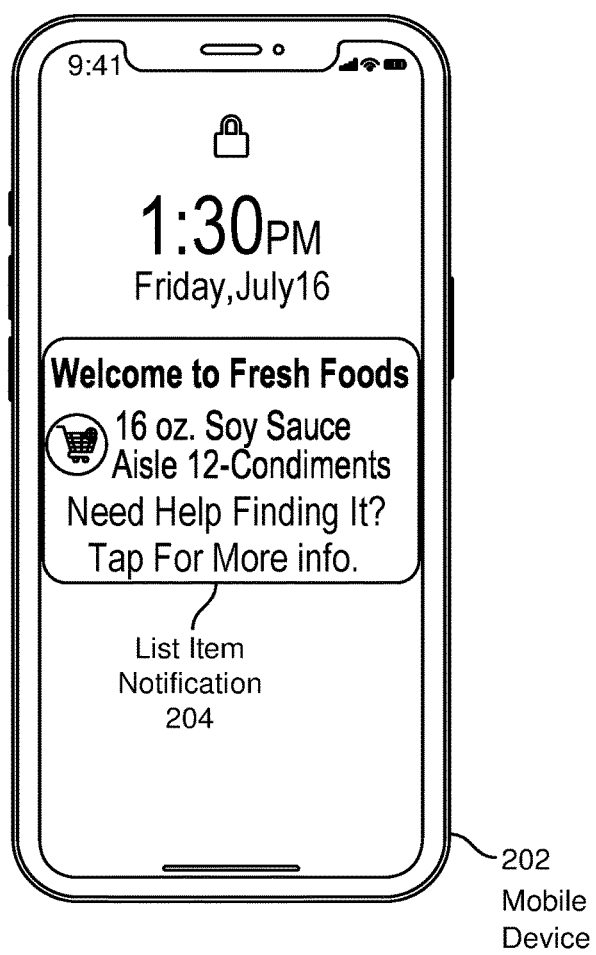
FIG. 2 illustrates a diagram of a mobile device in a locked state with a list item notification that a user can interact with to perform list item operations, in accordance with one or more example embodiments of the present disclosure.

FIG. 2 illustrates a diagram 200 of a mobile device 202 in a locked state with a list item notification 204 that a user can interact with to perform list item operations, in accordance with one or more example embodiments of the present disclosure. Techniques described in connection with FIG. 1 and FIGS. 3-7 may be utilized in connection with FIG. 2.

Mobile device 202 may refer to a smart phone comprising a display screen, one or more touch-based sensors, non-volatile memory, one or more processors, and memory (e.g., RAM) to store computer-readable executable instructions that, as a result of execution, cause the one or more processors to perform various functionality that is described in connection with FIG. 2. In at least one embodiment, mobile device 202 has operating system software that can be used to control various components of mobile device. Examples of mobile devices include smartphones, tablet computers, wearable devices such as smart watches, smart glasses, and more. While a mobile device is illustrated in FIG. 2, the techniques described in connection with FIG. 2 may apply to other types of devices as well.

In at least one embodiment, FIG. 2 illustrates a mobile device 202 in a locked state. A mobile device may be able to operate in various states, such as a locked state and an unlocked state. Other states may exist. A locked state may refer to a state in which a user is able to perform limited computer-based actions. For example, when mobile device 202 is in a locked state, supported computer-based actions may include inputting a sequence of characters or digits to submit a passcode, provide biometric data via a sensor such as a fingerprint scanner, and so on. In some embodiments, mobile device 202 allows users to access notifications such as item list notification 204 while the device is in a locked state. However, the ability to perform some computer-based actions and/or access some data may be limited. For example, the ability to access various applications on the mobile device, place phone calls, change password information, make purchases, etc. may be restricted while the mobile device is in the locked state. Some or all of these computer-based actions may be perform and/or data accessed in response to the user providing a correct passcode, a recognized fingerprint, a recognized voice, a recognize phrase uttered, a recognized iris, a recognized facial pattern, or other suitable form of authorization and/or authentication.

While mobile device 202 is in a locked state, a user may have the ability to interact with notifications such as list item notification 204 illustrated in FIG. 2 List item notification 204 may be generated from a shopping list from a mobile application. The mobile application may generate list item notification 204 upon determining that a user is at a specific location. For example, mobile device 202 may include a GPS receiver and a network connection to the Internet that is able to determine that the user (and the mobile phone) is located in a particular store, a type of store, etc. Location of the mobile device may also be inferred based on the mobile device connecting to a Wi-Fi network or other short-range network. A shopping list may be provided on the lock screen to facilitate easier navigation of the store.

One or more list item notifications may be displayed on the lock screen of mobile device 202 while it is in a locked state. For clarity, only one list item notification is illustrated in FIG. 2. Embodiments where multiple list item notifications are simultaneously shown on the lock screen of a locked device are discussed elsewhere in this disclosure, such as in connection with FIG. 3 and FIG. 4.

List item notification 204 may include various components. In at least one embodiment, an icon associated with a mobile application that generates the list item notification 204 is shown. In some embodiments, a location-specific text string is shown in the notification, providing the user with context regarding the location and where the user is. For example, a greeting "Welcome to Acme Corp. Supermarket on Broadway" may be generated based on the location information. In some embodiments, list item notification 204 includes a description of a list item, such as a name, a brand, a quantity, or other information related to the item. In some embodiments, the list item notification provides location-specific information. For example, mobile device 202 may submit a request to a service provider for information on where the item may be located. This location—which may be an aisle or category or a general area of the store—may be location-specific. For example, the "soy sauce" item may be located at "Aisle 12—condiments" in one store but in "Aisle 8—Asian foods" in another store. In some embodiments, list item notification 204 allows a user to seek additional information by tapping on the list item notification 204. For example, list item notification 204 may include a helper text "Need help finding it? Tap for more info." When the user taps list item notification 204, the user may be prompted to provide authentication and/or authorization information and, upon validation of such information, the mobile application is launched, which may be able to provide the user with additional help finding the item, such as a map of the store.

Figure 3:
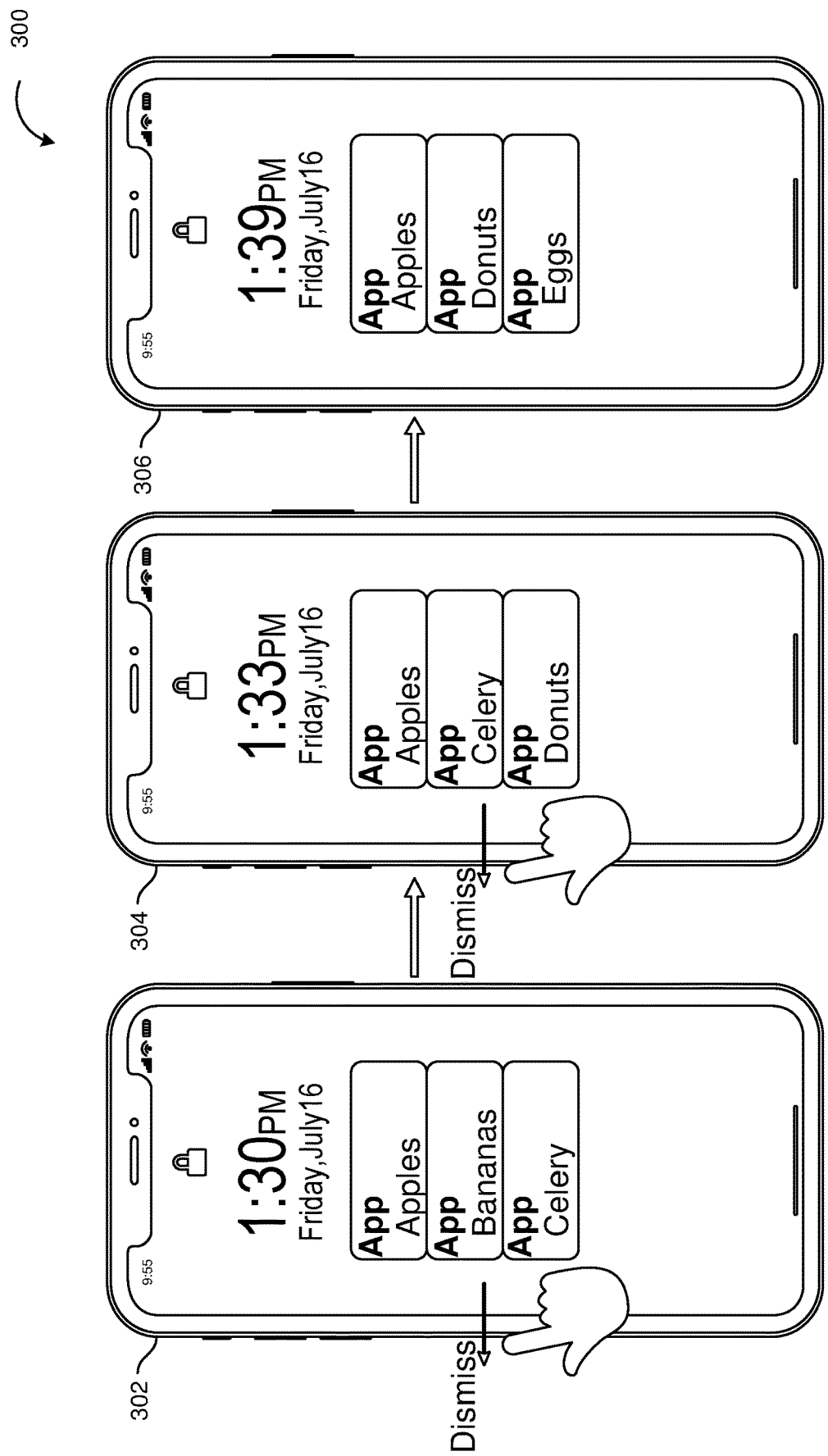
FIG. 3 illustrates a diagram where a user performs item list operations using list item notifications, in accordance with one or more example embodiments of the present disclosure.

FIG. 3 illustrates a diagram 300 where a user performs item list operations using list item notifications, in accordance with one or more example embodiments of the present disclosure. Techniques described in connection with FIG. 1, FIG. 2, and FIGS. 4-7 may be utilized in connection with FIG. 3.

In some embodiments, a mobile application is software that runs of a mobile device with access to and/or stores a data structure encoding an item list (e.g., shopping list) of list items (e.g., shopping items). In some embodiments, when the mobile device enters a locked state, list item notifications are made available on the lock screen of the mobile device which the user of the mobile device is able to interact with. A limited set of computer-based actions may be supported while the mobile device is in a locked state. Computer-based actions that are supported by the operating system of a mobile device may be used to perform operations that are supported by an item list of a mobile application. FIG. 3 illustrates a first graphical user interface (GUI) 302 of a mobile device, according to at least one embodiment. When a mobile device is in a locked state, it may be capable of displaying some number of notifications. For example, mobile device may display three list item notifications, as seen in first GUI 302, a first item "Apples", a second item "Bananas", and a third item "Celery" are illustrated in FIG. 3. In some embodiments, a computer-based action that is supported in the locked state is a swipe gesture that dismissing a notification. For example, as seen in first GUI 302, a user may tap-and-swipe on the second list item notification for "Bananas." The tap-and-swipe gesture may be designed by a mobile operating system to dismiss the notification, which removes it from the lock screen. Dismissing this notification may also trigger a background agent of a mobile application to run. The background agent may identify the computer-based action that was performed, identify the list item associated with the notification on which the computer-based action was performed, map the computer-based action to an operation supported by the item list, and perform the operation supported by the item list (e.g., on the list item of the notification). For example, dismissing the list item notification for "Bananas" may cause the corresponding shopping list item to be marked as completed, which will be reflected in the shopping list when viewed in the mobile application.

In some embodiments, when a user dismisses a list item notification, another list item notification is generated. For example, consider second GUI 304. After a user dismisses a notification for "Bananas" various operations may be performed. For example, the shopping list may be updated by marking "Bananas" as having been completed. Marking an item as being completed or skipped may involve updating a field in a data structure corresponding to the state of the item. The mobile application may also obtain the next item in the shopping list and generate a list item notification for the next item, which may be "Donuts" as seen in second GUI 304. The order of the list item notifications shown on the lock screen may be presented in any suitable order, such as the order in which the list item notifications are generated, the order in which a probabilistic model predicts that the user will shop (which may change during the shopping trip as items are being marked), and so on. In at least one embodiment, list item notifications are presented on the lock screen in the order which they are generated. For example, "Donuts" may be generated after "Bananas" is checked off and it is therefore the third item in the second GUI 304. In various embodiments, the number of list item notifications on the lock screen is maintained to a fixed, small number— for example 3 list item notifications such that if the "Donuts" list item notification is dismissed, snoozed, or otherwise removed, the lock screen transitions to the state shown in third GUI 306 where the next item in the shopping list—for example, "Eggs"—is surfaced. This may be repeated until there are two items left on the shopping list (e.g., two items that have not been completed), and then one item left, and then zero items left.

Figure 4:
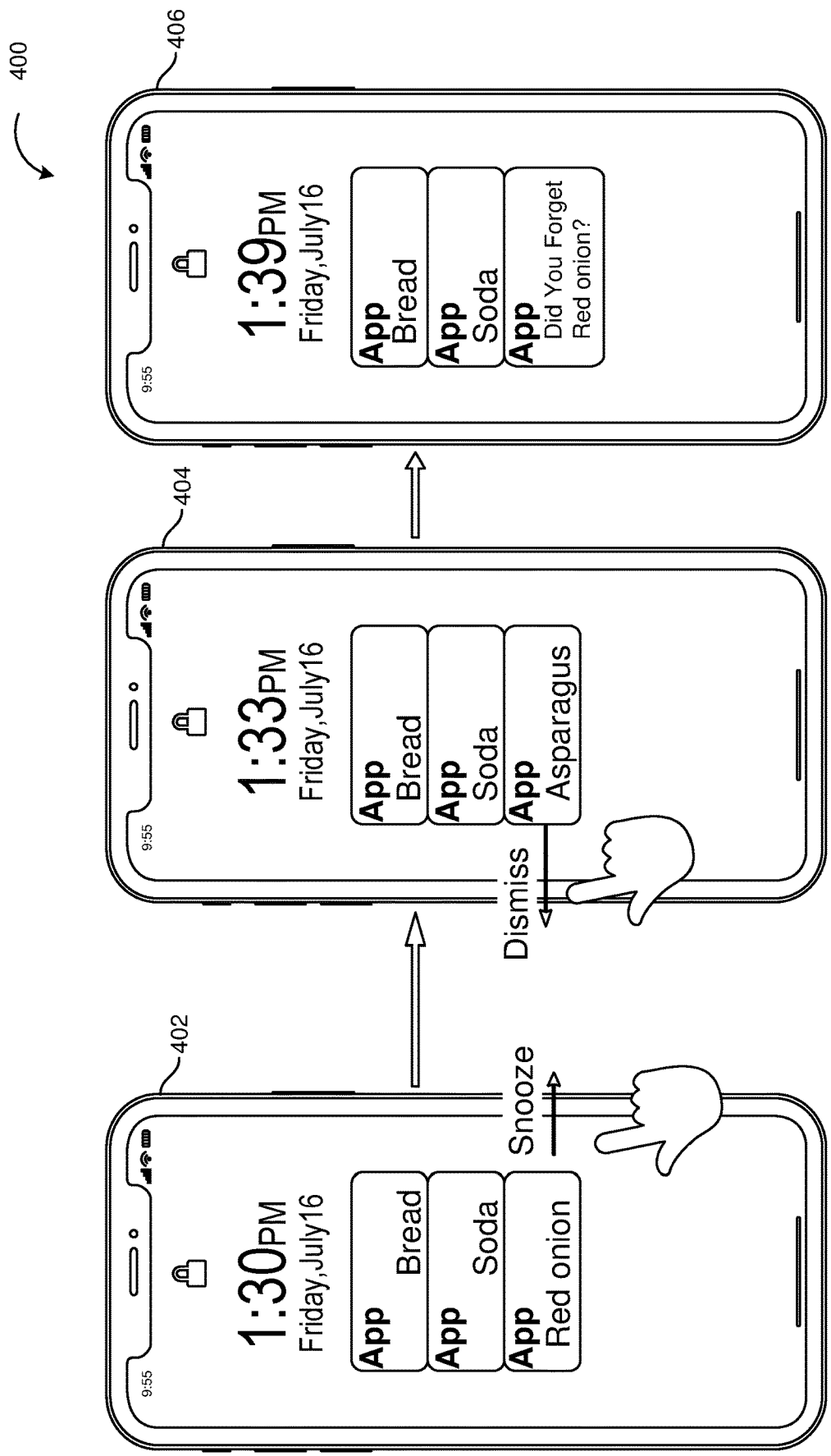
FIG. 4 illustrates a diagram where a user utilizes different computer-based actions to perform different list order operations, in accordance with one or more example embodiments of the present disclosure.

FIG. 4 illustrates a diagram 400 where a user utilizes different computer-based actions to perform different list order operations, in accordance with one or more example embodiments of the present disclosure. Techniques described in connection with FIGS. 1-3, and FIGS. 5-7 may be utilized in connection with FIG. 4.

In at least one embodiment, diagram 400 illustrates how a user can interact with a mobile device in a locked state to utilized a limited number of computer-based actions to perform various operations on an item list. For example, as seen in first graphical user interface (GUI) 402, several list item notifications may be accessible to a user while a mobile device is in a locked state, even if the user has not provided any authorization and/or authentication which would otherwise be needed to access the mobile application with access to the entire item list. A first computer-based action may involve a tap-and-swipe-right. A mobile operating system may interpret this computer-based operation as a Snooze gesture. As a result, the mobile operating system may remove the list item notification for "Celery" from the lock screen. Additionally, the mobile application (e.g., background task) may map the Snooze gesture to an operation supported by the item list. The Snooze gesture may be mapped to Skipping the item.

As a result of the "Red onion" item being removed from the lock screen, mobile application may generate a new list item notification to maintain three items on the lock screen. For example, the next list item, as seen in second GUI 404, may be for "Asparagus." A second computer-based gesture, such as tap-and-swipe-left, may be interpreted by an operating system as a Dismiss gesture. The Dismiss gesture may be mapped to a different list item operation, such as an operation that marks the item as being completed. After an item has been marked complete, it may be the case that no further list item notifications are generated for those items. In contrast, additional list item notifications may be generated for a skipped item. For example, if "Asparagus" was the last item in a shopping list, then the mobile application may generate reminder notifications for list items that were skipped over during the course of the shopping trip. For example, after skipping "Red onion" at first GUI 402, at a later point third GUI 406 will show a reminder list item notification. Reminder list item notification may be presented differently from the previously-discussed list item notifications. For example, there may be additional text and/or formatting for reminder list item notifications such as "Did you forget 'Red onion'?" to make it clear that reminder list item notification is being generated in response to a previous Skip operation that was performed on the "Red onion" list item.

In various embodiments, the user is able to perform other computer-based actions on list item notifications. For example, in some embodiments, a user is able to tap on a list item notification to launch the underlying mobile application. The mobile application may have various settings, options, and additional operations that the user is able to perform to manage various lists. In at least one embodiment, a user launches the mobile application upon arrival at a location, such as a grocery store, enables list item notifications, and then receives notifications above a lock screen that aid the user in finding various items on the shopping list in a convenient manner. Continuing with this example embodiment, the user may, in some cases, finish the shopping trip without completing all items—for example, apples may be sold out at the grocery store—and the user end the shopping trip by tapping on the "Apples" list item notification shown in FIG. 4 to launch the underlying mobile application and then interact with one or more graphical elements, such as buttons or icons, to end the shopping trip. In various embodiments, ending a shopping trip disables further list item notifications for an item list from being generated and/or removes already delivered list item notifications from the lock screen to de-clutter the user's lock screen notifications. In some embodiments, when the user enters or resumes the mobile applications, the mobile application determines the user's location and if the user's location has changed (e.g., user is no longer at the grocery store) then the mobile device may proactively prompt the user asking whether the user would like to end the shopping trip.

Figure 5:
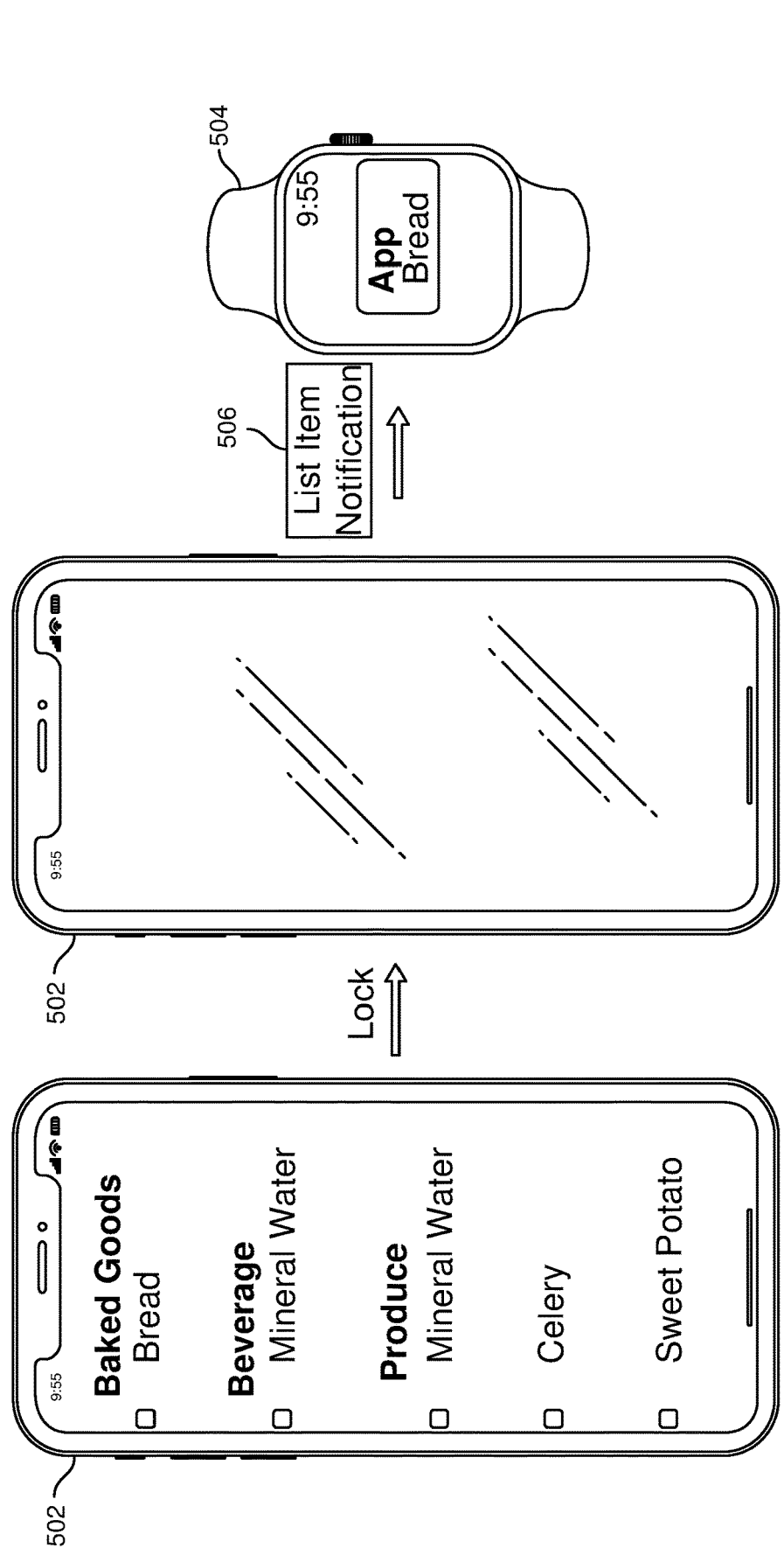
FIG. 5 illustrates a diagram where a first device communicates with a second device to present list item notifications, in accordance with one or more example embodiments of the present disclosure.

FIG. 5 illustrates a diagram 500 where a first device 502 communicates with a second device 502 to present list item notifications, in accordance with one or more example embodiments of the present disclosure.

In at least one embodiment, first device 502 is a smartphone or other suitable mobile device that is able to communicate with second device 504. First device 502 may include mobile application software that generates list item notifications and uses operating system software to send the list item notification to second device 502. The second device 502 may be a wearable device such as a smart watch or smart glasses where the list item notification may be easier for a user to access, view, and/or interact with. In some embodiments, when list item notifications are sent to secondary devices such as smart watches, the primary device is able to avoid performing one or more actions—such as turning on a screen or generating a local item notification, which would have otherwise been performed if the secondary device was not connected.

First device 502 may comprise a display screen that can be used to display list notifications, for example, in the manner described in connection with FIG. 1. In some embodiments, first device 502 operates differently when connected or otherwise operating in conjunction with second device 504. In some embodiments, when first device 502 operates in a paired mode, a user is able to launch a mobile application on first device 502 which detects that the user is at a location, prompts the user to confirm that the user is at the location, prompts the user to select a shopping list (e.g., item list), prompts the user to indicate whether the user wishes to enable shopping over the lock screen, or various combinations thereof. Upon determining that the user wishes to use list notifications, identifying an appropriate shopping list, and determining that the first device 502 is operating in a paired mode the mobile application may being generating list notifications in any suitable manner and communicate the list notifications to second device 504.

In some embodiments, first device 502 may determine obtain a shopping list item and generate an appropriate list item notification 506 for second device 504. In some embodiments, the type, format, structure, etc. of a list item notification 506 for the second device 504 may differ from the type, format, structure, etc. of a list item notification for the first device 502. For example, second device 504 may have different display properties from first device 502 and be capable of displaying more or less information. For example, second device 504 may be a wearable device such as a smart watch which is able to display fewer characters of text for a list item description. Accordingly, in at least one embodiment, a list item notification description field for second device 504 may have a smaller character limit than for a corresponding description for a notification that is being generated for first device 502.

First device 502 may send list item notification 506 for the second device in any suitable manner. First device 502 and second device 502 may be connected via a Bluetooth network using a leader/follower model where the first device 504 is a leader device and the second device 502 is a follower device. First device 502 may be connected via various types of short-range wireless technologies, which may be based on infrared (IR) or near-field communications (NFC). List item notification 506 for the second device may be sent from first device 502 to second device 504 over any suitable network. A leader/follower model may refer to a type of asymmetric communication or control where one device or process acts as a leader device that controls one or more other devices or processes (e.g., follower devices) and serves as their communication hub.

In some embodiments (not shown in FIG. 5), second device 504 generates list item notification 506. For example, first device 502 may provide information for the list item notification 506 such as an item description to be displayed, and the second device 504 populates a list item notification which is thereby generated locally on second device 504. In some embodiments, first device 502 defines a mapping of computer-based actions supported by second device 504 to operations that can be performed on item lists or individual list items. In some embodiments, second device 504 defines a mapping of computer-based actions supported by second device 504 to operations that can be performed on item lists or individual list items.

When first device 502 is paired with another device, first device 502 may generate a first list item notification for first device 502 and a second list item notification for second device 504. In some embodiments, first device 502 does not generate a local list item notification locally when it is paired with another device that supports list item notifications. When a mobile device is paired with another device, one or more power-saving measures can be taken—for example, rather than generating an item list notification and presenting it on the mobile device's display, the mobile device may instead transmit information to the connected device. Upon receiving the information, the connected device may enter a wake state and display a list item notification based on the information it received from the mobile device. In this way, the mobile device may be able to avoid activating its screen and/or more quickly enter a dormant or low-power mode as fewer operations are being performed on the mobile device.

Figure 6:
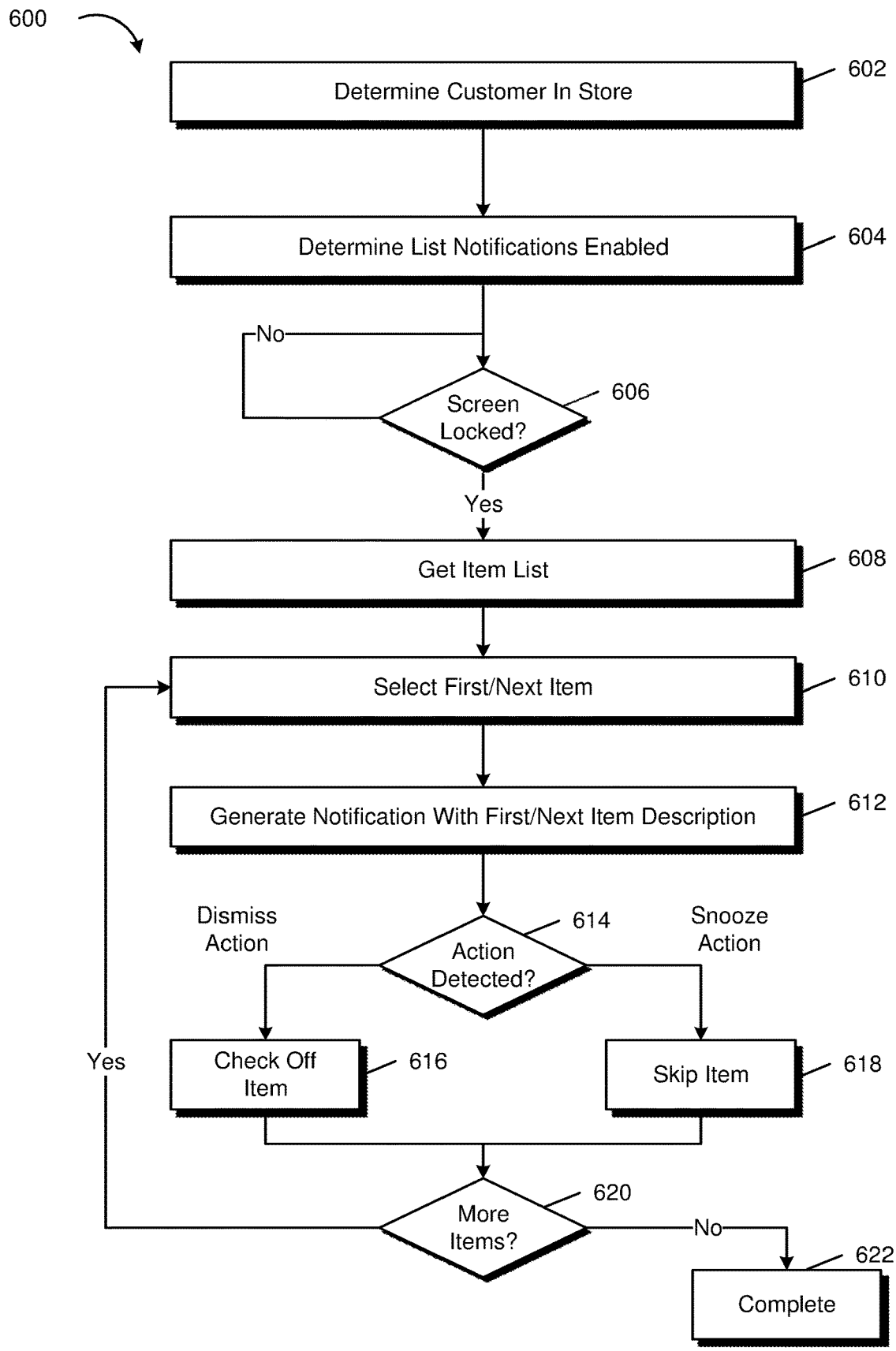
FIG. 6 shows an illustrative example of a process for processing list item notifications, in accordance with one or more example embodiments of the present disclosure.

FIG. 6 shows an illustrative example of a process 600 for list item presentation via lock screen notifications, in accordance with one or more example embodiments of the present disclosure. In at least one embodiment, some or all of the process 600 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1 and 7. In at least one embodiment, process 600 or a portion thereof is implemented using a mobile device, such as a smartphone, smart watch, or any other suitable portable electronic device.

In at least one embodiment, a mobile device that performs at least a portion of process 600 stores executable instructions to determine 602 that a customer is in a store. There may be various ways to determine that a customer is in a particular store. For example, various types of location sensors such as GPS receiver may be used to determine the GPS coordinates of a user and the GPS coordinates may be used to search a database to determine whether the user is at or near a store. In some embodiments, a user is prompted with a notification to confirm that she is at a store and/or is shopping at the store. In some embodiments, the mobile device infers that the user is shopping at the store by gathering various information—for example, if the user opens the shopping list via a mobile shopping app, then it may be used to infer that the user is at the store and plans to use the shopping list. Location information of the user—for example, using GPS or WPS—can be used to infer that the user is at a store. Network connectivity information, such as the user connecting to a Wi-Fi network of a store, can be used to infer that the user is at a store. Check-in information from a mobile app or website can be used infer that a user is at a store. NFC or other close-range technologies can be used to infer that a user is at a store—for example, customers at a store may be required or have the option to tap in to a store. External sensor information can be used to infer that the user is at a store—for example, one or more cameras at the store may use audio and/or visual data to infer that a user is at a store.

In some embodiments, an inference score is calculated based on one or more factors described above based on how likely the user is at a store. A score on a scale of 1 to 100 may be assigned, with 1 being low confidence that the user is at a location and 100 being high confidence that the user is at the location. If the score is above a threshold value, then there may be sufficiently high confidence that the user is at the store and no additional confirmation is needed. Conversely, if the inference score is below the threshold value, the user may be prompted with a notification asking the user if they are indeed at the store. A confirmation by the user may be equivalent to a maximum inference score (e.g., 100 out of 100).

In some cases, a user may be prompted with an initial notification to confirm that the user is at a location and/or whether they wish to enable list notifications. For example, a GPS receiver of a mobile device may be used to determine GPS coordinates and the GPS coordinates may be used to determine whether the user is at or near a grocery store. Other types of geolocation systems such as Wi-Fi positioning systems and can be used to determine relative and/or absolute location coordinates of a user. If the user is at or near the grocery store, a first notification may be generated and presented to the user asking the user to confirm that she is at the grocery store, whether she is shopping at the grocery store, whether she would like to use list notifications during the shopping trip, variations thereof, or any combination thereof.

In at least one embodiment, a mobile device that performs at least a portion of process 600 stores executable instructions to determine 604 that list notifications are enabled. Determining that list notifications are enabled may comprise checking whether notifications are enabled globally—for example, if the mobile device may be in an operating mode where notifications are disabled, such as a "do not disturb" which suppresses some or all notifications across the mobile device. In some embodiments, list notifications can be enabled separately from or independently of system-wide notifications. For example, a mobile application may have individualized settings to enable or configure the functionality of list notifications. For example, application settings may be used to configure how skipped items are processed, how many items to display at once, and so on. In some embodiments, a mobile application detects that list notifications are disabled and provides the user with a prompt asking if they would like to enable list notifications, such as when the mobile application is launched. In some embodiments, the mobile application may detect that list notifications are enabled but that system-wide notifications are disabled (e.g., device is in a "do not disturb" mode) and the mobile application can surface a prompt notifying the user that global notifications settings have disabled list notifications and indicate how to enable global notifications so that list notifications may be surfaced through the mobile operating system. If list notifications are enabled, then process 600 may proceed to step 606. If list notifications are not enabled, the process 600 may be paused until an indication that list notifications are enabled is detected—for example, a system notification that the mobile device exits "do not disturb" mode and is ready to display notifications.

In at least one embodiment, a mobile device that performs at least a portion of process 600 stores executable instructions to determine whether 606 the mobile device's screen is locked. The mobile device may determine that the screen is locked, is off, is in an idle state, etc. as a way to infer that the user is not able to conveniently access the item list directly. Making a determination that the screen is locked may be viewed as one example of how process 600 determines that list item notifications should be generated. In at least one embodiment, a mobile application's operating system publishes notifications regarding the screen state, such as whether the screen is locked. A background task for a mobile application may receive such notifications regarding the screen state, and upon receiving a notification that the screen is locked, proceeds to step 608 of the process illustrated in FIG. 6.

In at least one embodiment, a mobile device that performs at least a portion of process 600 stores executable instructions to get 608 item list. The device may obtain the item list in any suitable manner, such as by loading locally stored app data, by submitting a request to a service provider to get the item list, by accessing a text message encoding the list data, and so on. The list data may be encoded in any suitable manner, and getting the item list may involve data transformation operations. For example, a text message may encode a shopping list in a format that is optimized for human readability, and may be translated to a suitable data structure such as a vector or queue of structured list items. List items may have various components such as a string for the item description, an integer for quantity, an enumerated data type for the unit of measurement for the quantity (pounds, ounces, gallons, dozen, etc.), a Boolean for whether the item has been checked off or not, and so on. These are merely illustrative examples. Items may have multiple states associated with them—for example, a list item may be checked off, skipped, or not yet actioned on. An item list, in at least one embodiment, refers to a data structure or other suitable data object that can be programmatically modified in response to actions performed by a user interacting with a mobile device, such as via a touch screen.

In at least one embodiment, a mobile device that performs at least a portion of process 600 stores executable instructions to select 610 the first item from the item list. The item list may be sorted in any suitable order, such as an order that is defined by the user based on the order in which they added items to the list, based on an order that the user sets after compiling the list or a portion thereof, based on an order in which the user or others have selected items from the store, and so on. In some embodiments, the state of items in the item list is inspected and some items may be omitted. For example, items in a grocery list may have a field indicating the state of the item, such as whether the item has already been checked off or completed. One such example may involve a shopping trip to multiple grocery stores where some items are purchased at a first store and other items (e.g., which may not be available at the first store) are purchased from a second store. Items that have already been checked off are omitted in at least one embodiment, and the item list is enumerated until the first item that has not yet been checked off or complete has been obtained. In some embodiments, selecting the first item from the item list involves selecting the first item from the item list that meets a criteria. The criteria may, for example, be that the item has not been checked off already, that the item (or an appropriate substitute) is in stock according to store inventory information, and so on.

In at least one embodiment, a mobile device that performs at least a portion of process 600 stores executable instructions to generate 612 a notification with a description of the first item. A mobile application (e.g., background task) may generate a notification in any suitable manner. A mobile operating system may allow system notification to specify one or more types of body text. The notification may display the application name, a message, a sound to play, additional information related to the application such as an app icon, and so on. In some embodiments, the operating system or notification manager allows the application to specify one or more action buttons, which may be mapped to the operations for checking an item off the list and/or skipping the item. However, in other embodiments, only a set of predefined actions are supported, such as snoozing and dismissing the notification.

In at least one embodiment, a mobile device that performs at least a portion of process 600 stores executable instructions to determine whether 614 an action is detected. An action may refer to an interaction between a user and a mobile device, such as a press or swipe gesture on a touch screen. In various embodiments, users can interact with notifications on a lock screen, even if the device is locked. A mobile device such as a smartphone or smart watch may support various gesture-based actions such as swipes and taps. In some embodiments, an action is performed on a notification by swiping the notification. Swiping a notification to the left may correspond to a first action whereas swiping the notification to the right may correspond to a different action. In some embodiments, a notification supports action buttons. For example, a user may be able to tap or tap-and-hold on a notification to display one or more action buttons associated with the notification. A notification may have a "Check Off" action button or equivalent thereof, and a "Skip" action button or equivalent thereof, in at least one embodiment.

In various embodiments, an actin that a user performs by interacting with a mobile device such as a smartphone or smart watch may be mapped to an operation to perform on the item list. For example, a mobile operating system may support a variety of gestures, which can be mapped to different item list operations. A user may dismiss a notification for an item by swiping the notification to the right. When the notification is dismissed, the operating system may notify the mobile application (e.g., background task) that the notification for a particular item was dismissed, and this dismiss action may be mapped to a list notification operation to check off 616 the item. Checking off the item may comprising marking a bit or other type of variable to indicate that an item has been checked off. Accordingly, the gesture may cause the performance of both a mobile operating system operation to dismiss the notification by removing it from a notification tray, as well as cause a mobile application (e.g., background task) to perform an item list operation to update the status of an item from unchecked to checked.

Various actions may be supported. For example a mobile operating system may simultaneously support different gestures for dismissing and snoozing a notification. If the operating system of the mobile device detects a snooze action, the notification may be removed from the notification try and a mobile application (e.g., background task) is notified to perform an item list operation to skip 618 the item associated with the notification. The notification may be dismissed in the same or similar manner to how the notification is removed from the system's notification tray when an item is checked off. A mobile application may allow a list item to be skipped in any suitable manner. For example, snoozing a lock screen notification may cause the list item associated with the notification to be skipped. A skipped item may be marked skipped (e.g., state is either unchecked/checked/skipped). In some embodiment, when an item is skipped, it is moved to the end portion of the item list, when it will then be displayed again. For example, if the item list is implemented using a queue data structure (e.g., a first-in-first-out queue) an item may be popped from the top of the queue, displayed in a notification, and pushed to the back of the queue in response to the item being skipped. In some cases, the end portion of an item list refers to the terminal end of the list (e.g., an item may be enqueue to the rear of a data structure). In some embodiments, the end portion of an item list refers to a portion of a shopping list that follows the portion of the shopping list which users have not yet interacted with.

In at least one embodiment, a mobile device that performs at least a portion of process 600 stores executable instructions to skip 618 the item. The first item may be skipped in response to detecting a snooze action. The snooze action may be an action that is supposed by the operating system of the mobile device. When the snooze action is performed, the operating system may send a message or notification to the mobile application managing the item list. The mobile application may receive a message or notification associated with the first item from the operating system and, in response to receiving the message or notification associated with the first item, skip the first item. The mobile application may skip an item by marking the item as being skipped. The mobile application may skip an item by moving it to the bottom of the item list. Variations and combinations of skipping techniques can be applied in any suitable combination. For example, an item may be skipped by moving the item to the bottom of the item list and marking it as having been skipped such that when the item is reached for a second time, the notification generated for the item after it has been skipped may be different from the first time a notification was generated for the item. For example, the first time an item is surfaced, the notification may be "1 dozen Grade A large eggs" but after it has been skipped at least once, the notification may include additional information based on the message being skipped, such as a reminder to the user such as "Did you remember to get—1 dozen Grade A large eggs?" In some embodiments, if an item is skipped once, twice, or any suitable threshold number of times (e.g., n>1), then no subsequent list item notifications are generated.

In some embodiments, other actions in addition to the actions illustrated in FIG. 6 can be supported in addition to those shown in FIG. 6. In some embodiments, an action can be processed based on a voice command, such as a user speaking a command into a microphone connected to a mobile phone. For example, a user may say "Alexa, I got the eggs" and an audio signal may be captured by a microphone, which is provided to a speech-to-text module to produce a text-based transcript of the audio, and then the text data is semantically processed to identify an operation to perform on an item in the item list—in this example, the action may refer to an action to check off an item (e.g., according to step 616) and the item "eggs" may be identified as specific item in the item list. In some cases, a confidence score is attached to the predicted item and if it is below a specific threshold, the user may be prompted for additional information such as "Thanks—was that the '1 dozen Grade A large eggs' on your shopping list?" or disambiguate between multiple potential shopping list items "Thanks—was that the '1 dozen Grade A large eggs' or the '1 pack chocolate covered Easter eggs' in your shopping list?"

In at least one embodiment, a mobile device that performs at least a portion of process 600 stores executable instructions to determine whether 620 more items are in the item list. In some cases, a background task of a mobile application determines whether there are more items in an item list after an action is detected and an item list operation is performed. In some embodiments, steps 610-620 are repeated until there are no more items in the shopping list that the user needs to be notified of. In some embodiments, each item of an item list is displayed only once via notifications. In some embodiments, skipped items can be displayed multiple times. In some embodiments, a skipped item appears exactly twice—once initially, and then the second time after being snoozed; if the item is snoozed a second time, additional notifications for the item are not generated.

In some embodiments, the system performs a completion 622 step. The completion step may involve the terminal of the mobile application (e.g., background task) or switching to an idle state. In some embodiments, the mobile application generates a completion notification congratulating the user for checking off all items on the item list. In some embodiments, no completion action is performed, and the checking off of the last item in an item list represents the completion of the list notification user experience.

The examples presented herein are not meant to be limiting.

Figure 7:
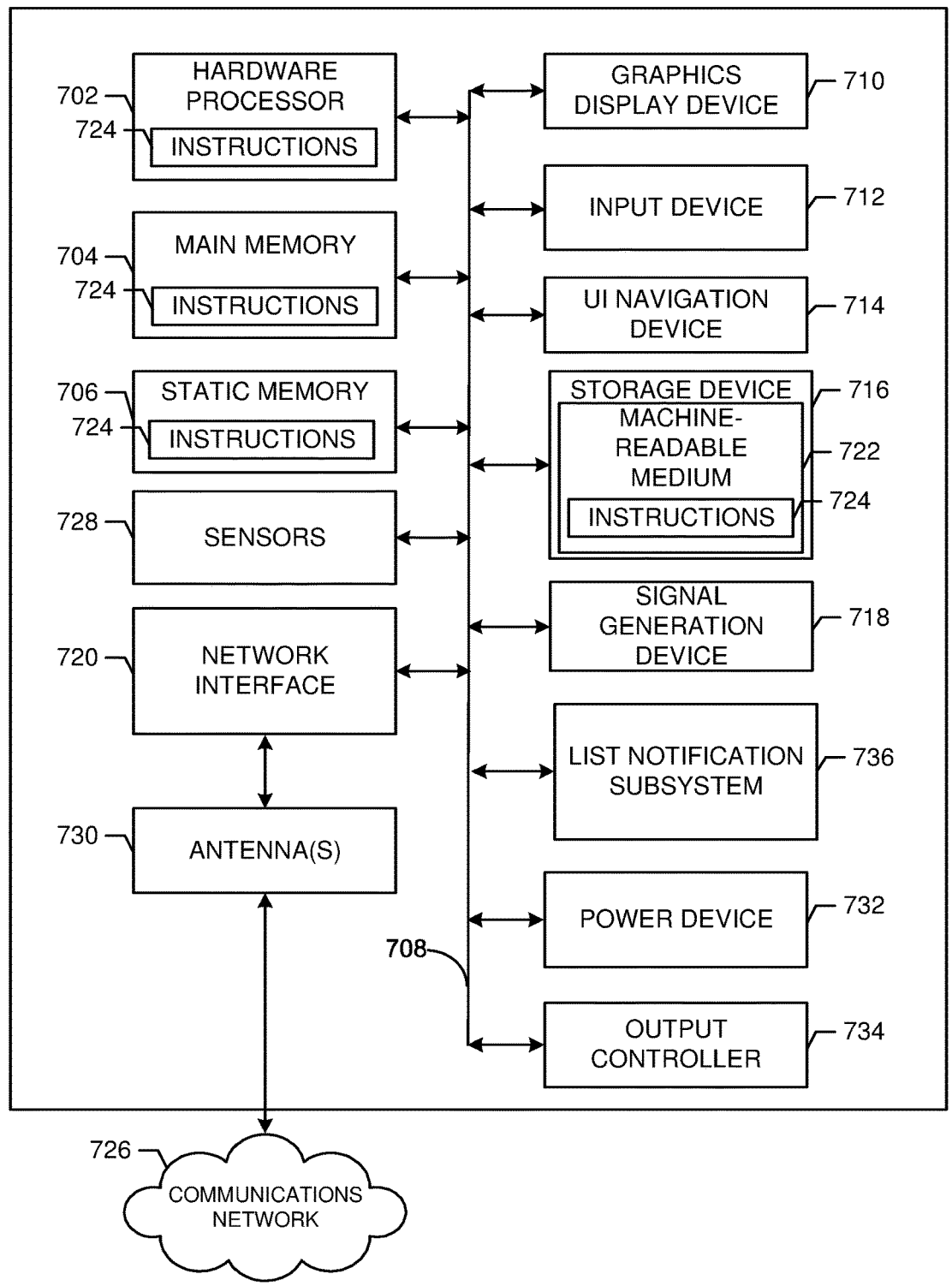
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., implemented in whole or in part in the context of embodiments described in connection with other figures. In some embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations. Techniques described in connection with FIGS. 1-6 may be implemented at least in part on machine 700.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include any combination of the illustrated components. For example, the machine 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (e.g., drive unit) 716, a signal generation device 718, and a network interface device/transceiver 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

Global Positioning System (GPS) refers to a type of a global navigation satellite system and is merely an illustrative example of a positioning system that can be used to determine relative and/or absolute positions. Examples of other positioning systems include other global navigation satellite system such as GLONASS, Galileo, and BeiDou Navigation Satellite System (BDS).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

Computer system 700 may include software and/or hardware implementation of list notification subsystem 736 which may be in accordance with those described elsewhere in this disclosure, such as those discussed in connection with FIG. 1. In some embodiments, list notification subsystem 736 is a software application or module (e.g., a dynamically linked library) that includes code, data, or other resources that are utilized to implement various functionalities described throughout this disclosure. List notification subsystem 736 may include executable code that, as a result of execution by one or more processors, causes processes such as those described in connection with FIG. 6 to be implemented at least in part on computer system 700. For example, list notification subsystem 736 may refer to a component of a software application that interacts with a mobile device operating system to generate list notifications which are displayed while the device is in a locked state and allows a user to perform various computer-based actions on the list notification to perform one or more operations supported by an item list that is managed by the list notification subsystem 736. In some cases, list notification subsystem 736 provides list item information to another device (e.g., a wearable device that is paired to computer system 700). In various embodiments, a user performs a computer-based action on a list item notification generated by subsystem 736 which causes a background agent to be executed while the device is in a locked state, wherein the background agent maps the computer-based action to an operation supported by a list item, such as marking an item as completed or skipping an item of the item list.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
    determining that a user of a mobile device is at a location associated with an item list of a mobile application running on a mobile operating system (OS);
    determining that list item notifications are activated by the user;
    determining that the mobile device is in a locked state;
    obtaining the item list;
    determining a first list item of the item list;
    generating a first mobile device notification for the first list item that is accessible to the user of the mobile device while the mobile device is in the locked state;
    presenting the first mobile device notification on a display device of the mobile device;
    detecting, in the locked state, a touch-based gesture performed on the first mobile device notification;
    determining, based on the touch-based gesture, an OS-level operation supported by the mobile operating system;
    mapping the touch-based gesture to an application-level operation supported by the item list in the locked state;
    causing the OS-level operation to be performed on the first mobile device notification and the application-level operation to be performed on the first list item by the mobile application, wherein performance of the OS-level operation removes the first mobile device notification to be removed; and responsive to the removal of the first mobile device notification:
    determining a second list item of the item list;
    generating a second mobile device notification for the second list item that is accessible to the user that is accessible to the user of the mobile device while the mobile device is in the locked state; and
    presenting the second mobile device notification on the display device of the mobile device.

2. The computer-implemented method of claim 1, wherein:
    causing the operation to be performed on the first list item comprises updating a state of the first list item.

3. The computer-implemented method of claim 1, wherein
    the first mobile device notification is presented at a first location on the display device of the mobile device;
    the second mobile device notification is presented at a second location on the display device of the mobile device; and
    the first location and the second location are different.

4. The computer-implemented method of claim 1, wherein the first information comprises a first description of the first list item and the second information comprises a second description of the second list item.

5. A mobile device, comprising:
    one or more processors; and
    memory storing executable instructions that, as a result of execution by the one or more processors, cause the mobile device to:
        determine the mobile device is at a location;
        obtain an item list associated with the location, wherein a plurality of operations can be performed on the item list by an application of an operating system (OS) running on the mobile device;
        select a first item from the item list;
        generate, based on the first item, a first notification, wherein the first notification is accessible while the mobile device is in a locked state;
        determine performance of a touch-based gesture in connection with the first notification;
        determine, based on the touch-based gesture, an OS-level operation supported by the operating system;
        map the touch-based gesture to an application-level operation of the plurality of operations, wherein the application-level operation is supported by the application in the locked state;
        perform, at the operating system, the OS-level operation; and
        perform, at the application, the application-level operation on the first item.

6. The mobile device of claim 5, wherein executable instructions include further instructions that, as a result of execution by the one or more processors, further cause the mobile device to remove the notification from a lock screen of the mobile device based on detecting performance of the OS-level operation.

7. The mobile device of claim 5, wherein the plurality of operations that can be performed on the item list include:
    a first operation to mark an item as completed; and
    a second operation to mark item as skipped.

8. The mobile device of claim 7, wherein:
    the instructions to perform the operation comprise instructions that, as a result of execution, cause the mobile device to move the first item to an end portion of the item list.

9. The mobile device of claim 5, wherein:
    the mobile device is a first mobile device;
    the executable instructions include further instructions that, as a result of execution by the one or more processors, further cause the mobile device to provide the notification to a second mobile device; and
    the executable instructions to detect the performance of the touch-based gesture in connection with the first notification comprise instructions that, as a result of execution by the one or more processors, cause the first mobile device to receive an indication that the touch-based gesture was performed on the second mobile device.

10. The mobile device of claim 9, wherein the first mobile device is a smartphone and the second mobile device is a wearable device.

11. The mobile device of claim 5, wherein executable instructions include further instructions that, as a result of execution by the one or more processors, further cause the mobile device to display the first notification on a display device of the mobile device.

12. The mobile device of claim 5, wherein:
    the mobile device further comprises a global positioning satellite (GPS) receiver; and
    the executable instructions include further instructions that, as a result of execution by the one or more processors, further cause the mobile device to:
    determine GPS coordinates of the mobile device;
    determine first metadata associated with the GPS coordinates;
    select the item list from a plurality of item lists;
    determine second metadata associated with the item list; and
    determine that the first metadata and the second metadata match.

13. A non-transitory computer-readable storage medium storing executable instructions that, as a result of being executed by one or more processors of a computer system, cause the computer system to at least:
    determine location information for the computer system;
    determine, based on the location information, an item list managed by an application running on an operating system of the computer system;
    generate one or more notifications for the item list, wherein the one or more notifications are accessible without requiring the computer system to enter an unlocked state;
    provide, without requiring authorization, access to the one or more notifications while the computer system is in a locked state;
    determine performance of a touch-based gesture computer based action on a notification of the one or more notifications;
    determine, based on the touch-based gesture, an OS-level operation supported by the operating system;
    map the touch-based gesture to an application-level operation supported by the application on the item list in the locked state;
    perform, at the operating system, the OS-level operation; and
    perform, at the application, the application-level operation.

14. The non-transitory computer-readable storage medium of claim 13, wherein the executable instructions to provide, without requiring authorization, the access to the one or more notifications comprise instructions that, as a result of being executed by the one or more processors, cause the computer system to display the one or more notifications on a display device while the computer system is in the locked state.

15. The non-transitory computer-readable storage medium of claim 13, wherein:
   the notification comprises a description and quantity of a first item of the item list; and
   access to additional information associated with the first item requires authorization.

16. The non-transitory computer-readable storage medium of claim 13, wherein:
   a first touch-based gesture to dismiss the notification maps to a first operation to complete a item of the item list; and
   a second touch-based gesture to snooze the notification maps to a second operation to skip the item of the item list.

17. The non-transitory computer-readable storage medium of claim 13, wherein the instructions to determine the location information, as a result of being executed by the one or more processors of the computer system, further cause the system to:
   determine the location information based on a Wi-Fi connection.

18. The non-transitory computer-readable storage medium of claim 13, wherein the operation is a first operation to skip a first item of the item list and the instructions include further instructions that, as a result of being executed by the one or more processors of the computer system, cause the computer system to at least:
   move the first item to an end portion of the item list; and
   generate a second notification for the first item, wherein the second notification is accessible without requiring the computer system to enter the unlocked state; and
   provide access to the second notification while the computer system is in the locked state.

19. The non-transitory computer-readable storage medium of claim 18, wherein the second notification includes an indication that the application-level operation was performed on the first item.

20. The non-transitory computer-readable storage medium of claim 13, wherein the computer system comprises further instructions that, as a result of being executed by the one or more processors, cause the computer system to:
   request an indication of whether to enable notifications for the item list;
   generate the one or more notifications based on a response by the user that the notifications should be enabled; and
   disable generation of subsequent notifications in response to a second indication by the user that notifications should be disabled.

* * * * *